United States Patent [19]
Hougaard

[11] Patent Number: 5,870,855
[45] Date of Patent: Feb. 16, 1999

[54] FLOWERPOT, ESPECIALLY FOR FORCING PLANTS WHILE USING AUTOMATIC WATERING

[75] Inventor: Erling Hougaard, Jyllinge, Denmark

[73] Assignee: OS Plastic A/S, Farum, Denmark

[21] Appl. No.: 530,318

[22] PCT Filed: Apr. 12, 1994

[86] PCT No.: PCT/DK94/00147

§ 371 Date: Oct. 4, 1995

§ 102(e) Date: Oct. 4, 1995

[87] PCT Pub. No.: WO94/23560

PCT Pub. Date: Oct. 27, 1994

[30] Foreign Application Priority Data

Apr. 13, 1993 [DK] Denmark ................................ 0422/93

[51] Int. Cl.⁶ ........................................................ A01G 9/02
[52] U.S. Cl. ............................................. 47/65.5; 47/65.6
[58] Field of Search ................................ 47/66 D, 65.5, 47/71, 65.6

[56] References Cited

U.S. PATENT DOCUMENTS

| | | | |
|---|---|---|---|
| 314,682 | 3/1885 | Kaiser | 47/66 D |
| 758,678 | 5/1904 | Müller | 47/66 D |
| 4,446,652 | 5/1984 | Anderson | 47/66 D |
| 5,010,687 | 4/1991 | Hougard | |
| 5,040,330 | 8/1991 | Belgiorno | 47/66 D |

FOREIGN PATENT DOCUMENTS

| | | | |
|---|---|---|---|
| 1398886 | 4/1964 | France | 47/66 D |
| 629282 | 4/1936 | Germany | 47/66 X |
| 4000950 | 7/1990 | Germany | 47/66 X |
| 189070 | 7/1937 | Switzerland | 47/66 D |
| 839144 | 6/1960 | United Kingdom | 47/66 D |

Primary Examiner—Michael J. Carone
Assistant Examiner—Joanne C. Downs
Attorney, Agent, or Firm—Pennie & Edmonds LLP

[57] ABSTRACT

A flowerpot, especially for forcing plants while using automatic watering, comprises a pot shell (10), a substantially horizontal bottom (14) having at least one first opening (28) and at least one channel (18), that is open downwardly and comprises a plane top wall (24) at a higher level that the bottom (14) and having at least one second opening (26). In the pot shell (10) there is at least one opening (20) forming an inlet to and an outlet from the channel (18). On the lower side of the pot bottom (14), supporting legs (16) are placed along the pot edge. According to the invention, the flowerpot comprises additional supporting legs (32, 32') extending along at least one section (A, A') of the pot bottom (14), said section with one cad facing a part of the edge of a first opening (28, 28') and with its other end facing a free part of the edge of the pot bottom (14) and/or an end wall of one of the channels (18).

14 Claims, 4 Drawing Sheets

FLOWERPOT, ESPECIALLY FOR FORCING PLANTS WHILE USING AUTOMATIC WATERING

TECHNICAL FIELD

The present invention relates to a flowerpot for use in forcing plants while using automatic watering. A flowerpot of this kind appears from U.S. Pat. No. 5,010,687.

BACKGROUND

The prior art relating to automatic watering of flowerpot cultures in large-scale market-gardening establishments comprises the so-called bottom watering, as well as watering according to the flood/ebb principle using water levels being raised and lowered.

When using bottom watering, the flowerpots stand with their perforated bottom on a water-conducting mat constantly being maintained in the wet state, so that the moisture can be absorbed into the pot from below.

With the bottom watering method, there is a risk of a ventilation problem appearing at the lowermost part of the pot due to the fact that the bottom of the pot and the surface of the mat are in close mutual contact. Poor ventilation may cause the filling material in the pot to become acidic or the roots of the plants to rot.

When the flood/ebb principle is used as the watering method, the flowerpots are placed in flat-bottomed tanks with a plane bottom. The tanks are periodically filled and subsequently again drained of water. Compared to the bottom-watering method, the flood-/ebb principle makes it possible to achieve improved control of the proportioning of water and improved control of the desired watering process depending on the specific conditions prevailing.

Even through the desired flood/ebb method implies that water is removed from the tank relatively quickly, it does not necessarily follow that the lowermost part of the filling of the flowerpot will also be freed of excess water sufficiently quickly. The removal of excess water is, however, a prerequisite for good ventilation, especially in the lowermost region of the pot filling. On the other hand, the flood/ebb principle offers the possibility of good air flow to the lowermost part of the pot, as the water is removed quickly from the region around the pot as described above.

It has already been suggested to improve the ventilation conditions by, as mentioned above, providing laterally outwardly facing openings in the lowermost end of the side walls of the flowerpot in the immediate vicinity of the pot bottom. These openings, in addition to letting in water, serve both for removing excess water from the pot filling and to give access for ventilating air to the lowermost part of the pot. Experience has shown, however, that excess water was not always removed and the ventilating conditions in many cases still were unsatisfactory.

In the flowerpot such as described in U.S. Pat. No. 5,010,687 to Hougaard, two distinctly separate bottom regions are provided, each equipped with its own passage opening, so that one of the regions may advantageously be used for one of the watering methods, and the other region for the other watering method. A first region is accurately delimited by the channel-limiting side walls. A second region, likewise accurately defined, exists outside of the channels. Each of the regions mentioned has its own passage opening or openings. The channels make it possible to control the ventilation through the passage openings. The passage openings are situated at a high level in the top wall of the channel. The height of the channels, as measured on the outside wall of the pot, may be made larger or smaller according to desire. Further, it is possible to provide the second region of the pot bottom, situated outside of the channels, with a base-surface area which is selected depending on conditions. This base-surface area of the pot, in the case of bottom watering, may rest on the water-conducting mat over an area of such a size, that the mat is not compressed too much. Finally, the length of the channels may be limited according to desire, making it possible to avoid channel segments unnecessarily reducing the inner space in the pot available for receiving pot filling. The supporting legs serve to stabilize the pot's ability to remain standing.

Experience has shown that problems with the ventilation of the pot filing may arise in flowerpots of the kind such as described in U.S. Pat. No. 5,010,687, when the plants are forced by using ebb/flood watering method. Even though the watering is generally carried out in the desired manner through the channels and the second passage openings situated in the top walls, some water will also seep in or out through the first openings, provided in the bottom of the flowerpot. This seeping in and out will influence a bottom layer of the pot filling substantially situated in the region between the projections formed by the channels and protruding into the side of the pot. Water seeping in through the first openings in the bottom will frequently not carry sufficient quantities of oxygen. Water seeping out through the same path will frequently not cause sufficient drying-out, to make it possible to avoid acidification of the lowermost bottom layer of the pot filling. This inhibits the development of the roots.

DISCLOSURE OF THE INVENTION

It is the object of the present invention to provide a flowerpot for use in forcing plants using automatic watering, with which it is possible to avoid this disadvantage by using the pot for ebb/flood watering. This object is achieved with a flowerpot, which according to the present invention is characterized as set forth in claim 1. In this manner, at least one well-defined bottom area limited by supporting legs is provided. This bottom area constitutes a passage, along which seepage inwardly and outwardly through the first openings of the bottom of the flowerpot is promoted. This, in turn, promotes the oxygenation of the filling material, without disturbing the ability of the flowerpot to function with the two differing methods of watering.

An advantageous embodiment of the flowerpot according to the invention makes it possible to utilize the channel characteristic of the bottom area with ebb/flood watering for the rapid supply of oxygenated water forwardly towards to the first holes defined in the bottom area. When using these channels, it is possible to decide how far inwardly towards the middle of the pot bottom, measured from the side of the pot, the first openings may be placed without problems arising.

BRIEF DESCRIPTION OF THE DRAWINGS

In the following detailed portion of the present description, the invention will be explained in more detail with reference to the drawings, in which.

DESCRIPTION OF THE PREFERRED EMBODIMENT

All the embodiments of the flowerpots shown are especially intended for use in forcing plants while using automatic watering. As used herein, the terms "force", "forced", and "forcing" refer to the common dictionary definitions of hastening the growth of plants. The pot consists of a shell 10, the upper edge of which constitutes a rim shoulder 12, and the lower edge of which continues in a substantially planar, horizontal bottom 14. Supporting legs 16 are situated on the lower side of the bottom 14, distributed around the latter's outer edge.

Figure 1:
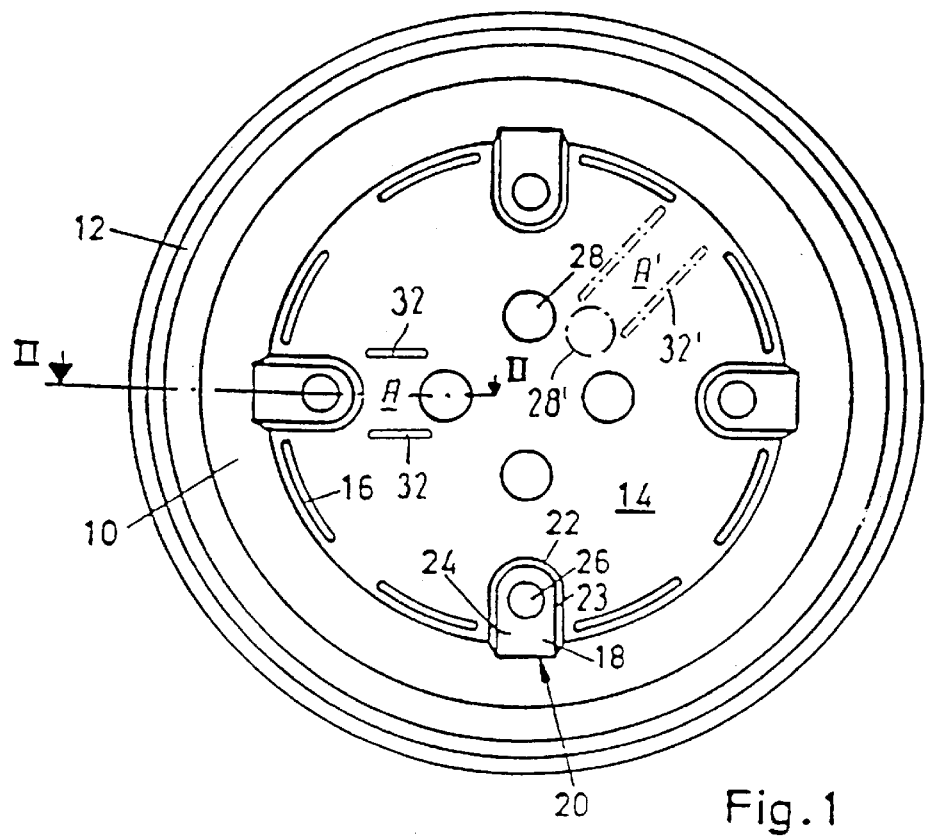
FIG. 1 shows an embodiment of a flowerpot according to the invention, viewed from below.

In the embodiment shown in FIG. 1, the bottom 14 comprises a number of downwardly open channels 18. Channels 18 each extend from a laterally-facing opening 20 in the lower edge of the shell 10 through a distance transversely to the pot. At its innermost end, the channel is closed by an end wall 22. The channels 18 have a trapezoidal sectional shape. The channels 18 are being defined by upright side walls 23 extending inwardly from the opening 20 and a limiting top wall 24. The top wall 24 faces the pot filling material and extends parallel to the pot bottom 14. The top wall is provided with passage openings 26 for water. The passage openings 26 are at a level above the pot bottom 14.

In the embodiment of FIG. 1, the passage openings 26 are circular in shape, and there is one opening for each channel 18. The passage openings may, however, be differently shaped, e.g. elongated, and likewise, there may be more than one passage opening for each channel.

Figure 2:
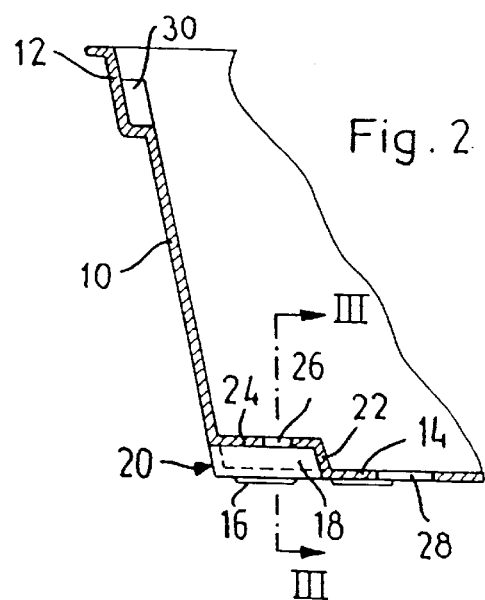
FIG. 2 is a sectional view taken along the line II—II in FIG. 1.

In the pot bottom 14 proper, other passage openings 28 are provided. As is shown in FIG. 2, these openings 28 are barred from direct communication with the passage openings 26 by the walls of the channel 18. When the pot is intended for use with bottom watering, the pot is placed with the bottom 14 on a watering mat, and in this case the supply of liquid to the pot filling material will occur through the passage openings 28. At the same time the passage openings 26 will act as ventilating holes.

If the pot is used in connection with the flood/ebb principle, the passage openings 26 will, in the "flood" state, function to supply liquid to the pot filling material, and, in the "ebb" state, function to remove water from the pot filling material. This results in ventilating the lowermost part of the pot. This effect may, to some extent, be supplemented by the passage openings 28 in the bottom 14.

The first supporting legs 16 are in the form of ribs of circular-arc shape. The channels 18, with their laterally-facing access openings 20, are situated between the oppositely facing ends of two neighboring ribs, as clearly shown in FIG. 1. The first supporting legs 16 are low so as not to prevent the pot bottom 14 from engaging a watering mat in a manner allowing the transfer of liquid when the pot is used for bottom watering.

The inside of the rim shoulder 12 is provided with spacing projections 30. These projections prevent the pots from nesting too closely within one another, when a number of pots are stacked on top of each other. When pots are stacked, the rim shoulder 12 of an upper pot will rest on the projections 30 of a lower pot.

In addition to the first supporting legs 16, corresponding second supporting legs 32 are placed on the pot bottom 14. Between legs 32 is defined a section A of the pot bottom 14, as shown in FIG. 1, 4, 6 and 9. Section A includes one end facing a part of the edge of the passage opening 28 and embracing the part of the edge of the opening (28) facing towards said section A. The opposite end of section A faces the end wall 22 in the channel 18. Opening 28 together with the opening 26 belonging to the channel 18 may be considered as a pair of mutually associated openings. The section A constitutes a passage, through which seepage of water in and out through the opening 28 is promoted.

Figure 9:
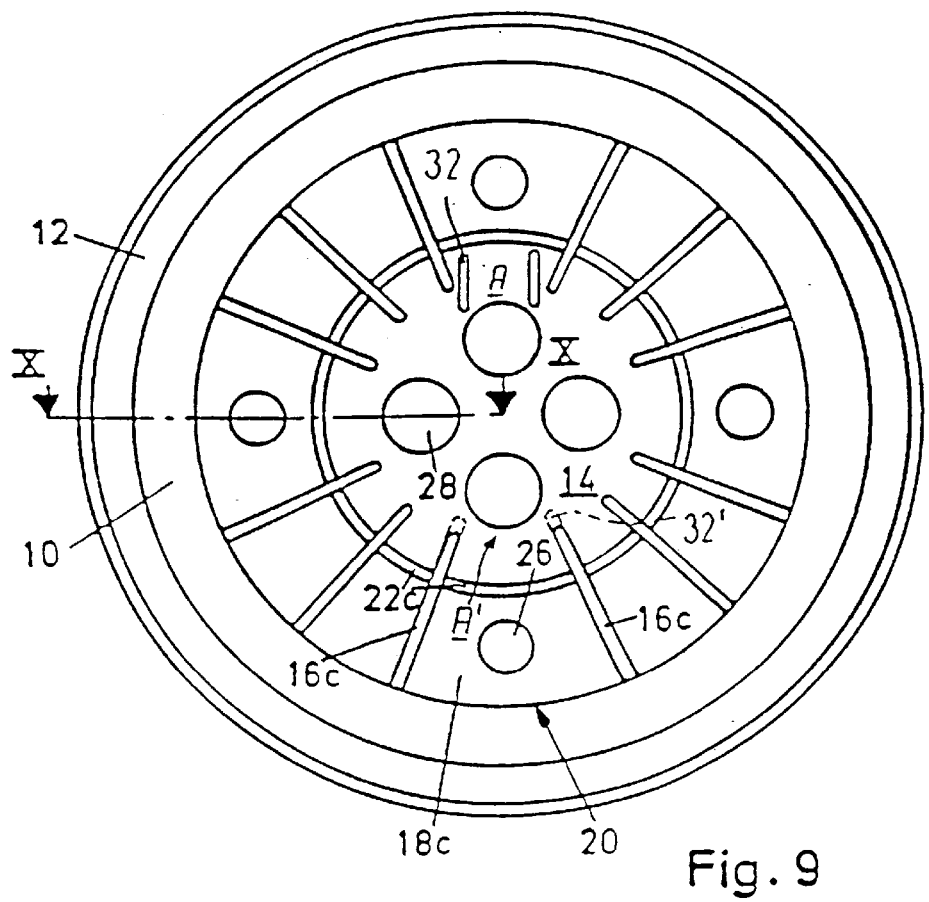
FIG. 9 shows a fourth embodiment of the flowerpot as viewed from below.
Figure 10:
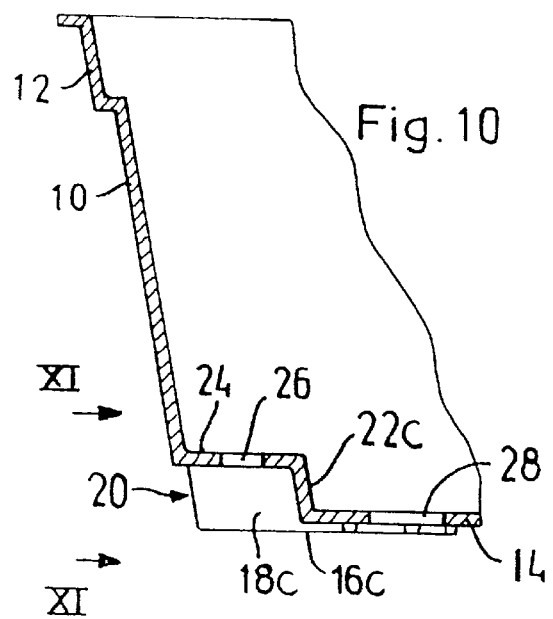
FIG. 10 is a sectional view taken along the line X—X in FIG. 9.
Figure 11:
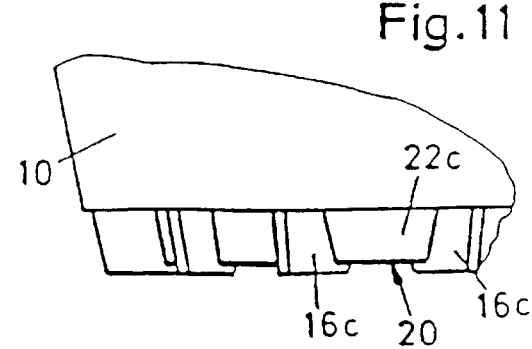
FIG. 11 is a view in the direction of the arrows XI—XI in FIG. 10.

Further, another embodiment, with section A' indicated in broken line, is shown in FIGS. 1 and 9. This embodiment comprises second supporting legs 32' defining a section A'. One end of section A' faces opening 28', and the opposite end faces a free sector of the edge of the pot bottom 14 between two neighboring first supporting legs 16.

Figure 4:
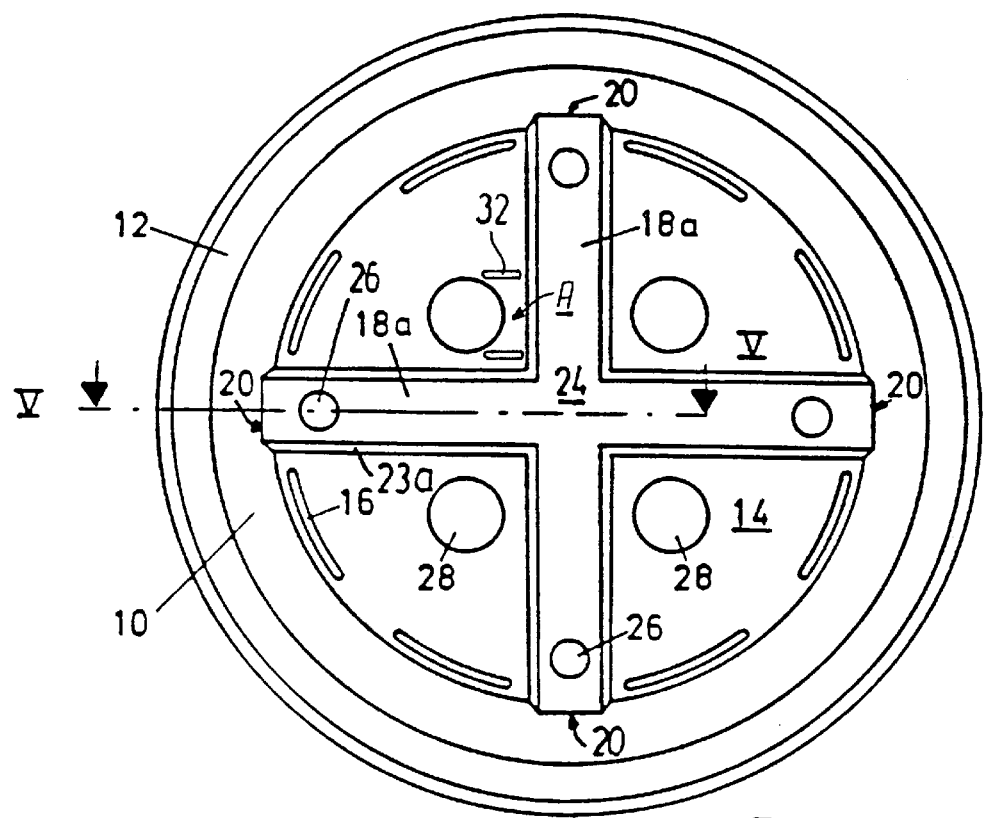
FIG. 4 shows a second embodiment of the flowerpot as viewed from below.
Figure 5:
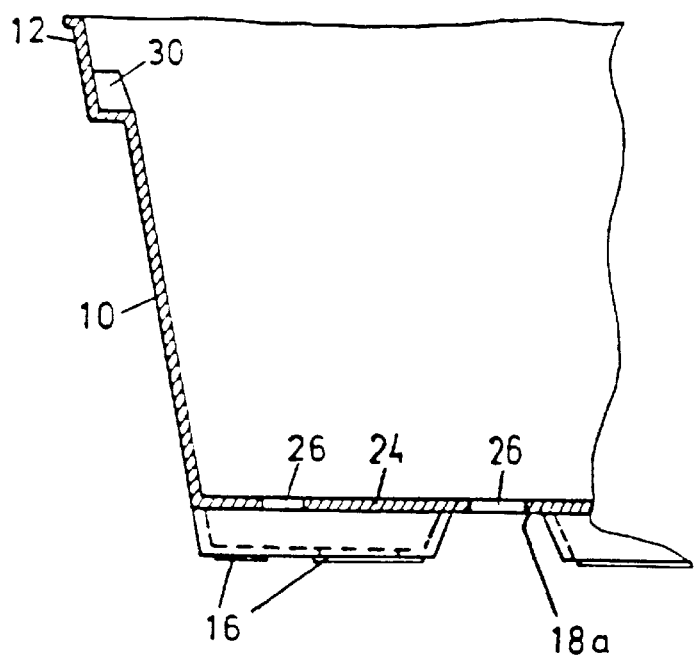
FIG. 5 is a sectional view taken along the line V—V in FIG. 4.

The embodiment shown in FIG. 4 differs from the one shown in FIG. 1. Instead of having channels 18 with a limited radial length, as shown in FIG. 1, FIG. 4 has transversely through-going channels 18a which extend across the bottom 14.

Channels 18a are defined by diametrically extending upright side walls 23a and a limiting top wall 24 which faces the pot filling material. The channels 18a comprise an access opening 20 at each end.

In the embodiment shown in FIG. 4, section A is limited by second supporting legs 32 extending between opening 28 and a side wall 23a of channel 18a. In all other respects, this embodiment corresponds to the one shown in and described with reference to FIGS. 1–3.

Figure 6:
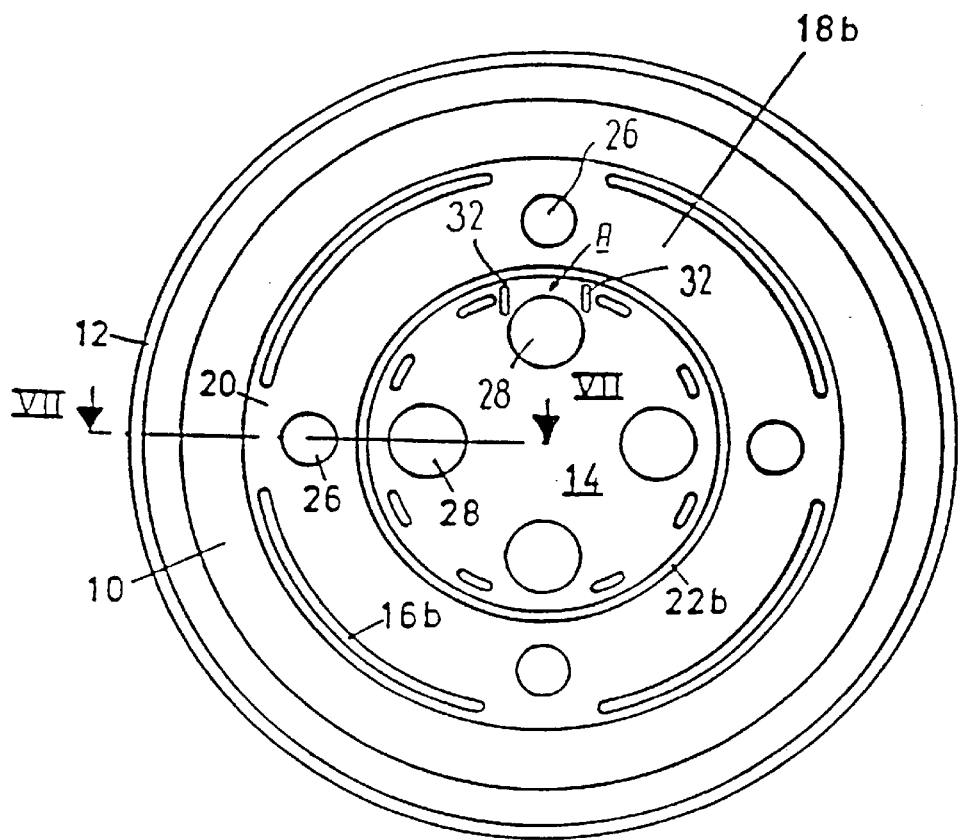
FIG. 6 shows a third embodiment of the flowerpot as viewed from below.
Figure 7:
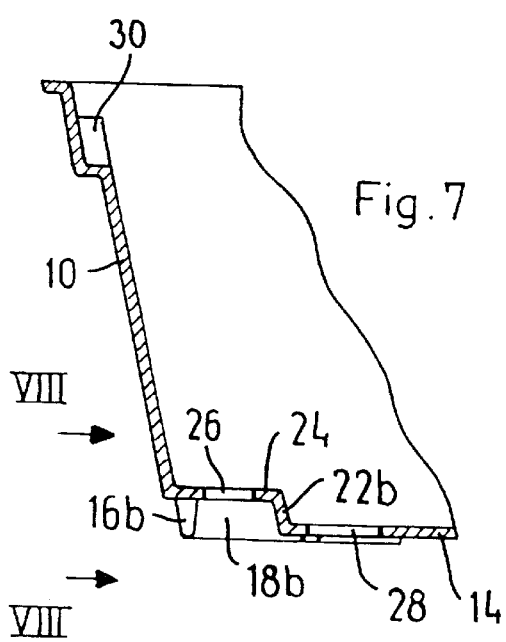
FIG. 7 is a sectional view taken along the line VII—VII in FIG. 6.
Figure 8:
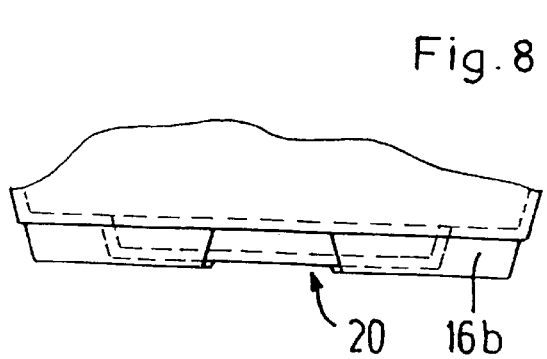
FIG. 8 is a view in the direction of the arrows VIII—VIII in FIG. 7.

The embodiment shown in FIG. 6 differs from both the one shown in FIG. 1 and the one shown in FIG. 4. Instead of including transversely extending channels 18 or 18a, the embodiment of FIG. 6 has an annular channel 18b. The annular channel 18b is internally defined by a circumferential limiting wall 22b, defining the channel relative to the pot bottom 14 and externally defined by ribs 16b. Ribs 16b are in the form of circular arcs forming the first supporting legs for the pot. The oppositely facing ends of two neighboring ribs 16b constitute the lateral limits for the laterally-facing openings 20 constituting the access openings to the channel 18b. As shown in FIG. 7, this channel also has a trapezoidal cross-sectional shape and passage openings 26 situated in the top wall 24 of the channel.

In FIG. 6, section A is defined by second supporting ribs 32 which extend between opening 28 and a free part of the edge 22b of the pot bottom 14. In this embodiment also, opening 28 and opening 26 constitute a pair of openings. Opening 26 is situated outwardly of the section A. Further, the opening 26 is situated immediately inwardly of opening 20. In all other respects, the same remarks apply to this embodiment as those applying to FIGS. 1–3. Ribs 16b, acting as first supporting legs, are so low, that even with the present embodiment, they do not prevent the pot bottom 14 from engaging a watering mat in a liquid-transferring manner.

From the three embodiments referred to above, the one shown in FIG. 9 differs in that ribs 16c constituting first supporting legs define the lateral limits for the channels 18c. The supporting legs are a number of transverse ribs 16c distributed along the periphery of the pot. In FIG. 9, the ribs are disposed radially on the bottom. Two such ribs together constitute upright side walls for a channel 18c. As shown in FIG. 9, in at least some of the top walls of these channels, passage openings 26 are situated. Like the channels 18, the channels 18c are closed at their innermost end by an end wall 22c.

Two embodiments are shown in FIG. 9. The embodiment shown in full line corresponds to the one shown in full line in FIG. 1. In the embodiment shown in broken line in FIG. 9, the section A', being a characteristic feature of the invention, is formed by supporting ribs 32' constituting extensions of the transverse ribs 16c. Apart from this, the rib shoulder 12 is not provided with spacing projections 30, as shown in FIG. 1 because the first supporting legs 16c may, in addition, constitute distance elements between two pots nested in each other; i.e., the supporting legs 16c on the upper pot resting on the top wall of the channel part 18c of the lower pot.

Figure 3:
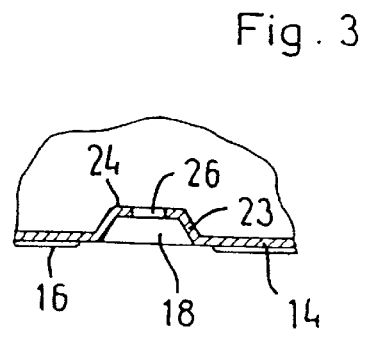
FIG. 3 is a sectional view taken along the line III—III in FIG. 2.

In all other respects, the same remarks apply to the embodiment shown in FIG. 9 as those applying to FIGS. 1–3, this again implying that the ribs 16c, acting as supporting legs, do not prevent the pot bottom 14 from engaging a watering mat in a liquid-transferring manner.

I claim:

1. A flowerpot, especially for forcing plants while using automatic watering, comprising:
    a pot shell sidewall (10);
    a substantially horizontal bottom surface (14) associated with said shell sidewall having
      (1) at l east one first opening (28), and
      (2) at least one channel (18, 18a, 18b), said at least one channel being open downwardly and comprising a plane top wall (24) positioned above the bottom surface (14) and at least one channel side wall, said at least one channel extending from the shell sidewall and having an access opening (20) on the shell sidewall, said at least one channel having defined therein at least one second opening (26);
    a plurality of first supporting legs (16) protruding downwardly from the bottom surface around the outer edge thereof; and
    at least one pair of second supporting legs (32) protruding downwardly from said bottom surface in side by side relation, said at least one pair of second supporting legs defining between them at least one section (A) of the bottom surface (14), said at least one section (A) having a first end open to at least a part of the edge of the at least one first opening (28) for communication with the at least one first opening (28), and a second end open to at least one of (1) the outer edge of the bottom surface (14) or (2) the channel side wall of at least one of the at least one channel, said at least one section promoting seepage into and out of said at least one first opening.

2. The flowerpot according to claim 1, wherein said at least one first opening (28) and said at least one second opening (26) together constitute at least one mutually associated pair of openings, and the at least one section (A) of the bottom surface (14) extends between said at least one mutually associated pair of openings.

3. The flowerpot according to claim 1, wherein the plurality of first supporting legs are ribs and the at least one pair of second supporting legs (32) are situated as extensions of the ribs (16c) with the ribs (16c) defining the channel side walls to laterally limit the at least one channel.

4. A flowerpot comprising:
    a shell sidewall;
    a substantially planar bottom surface having at least one first opening and at least one channel, said at least one channel being open downwardly and being defined by a substantially planar top wall and at least one channel side wall, said top wall being positioned above said bottom surface, said at least one channel defining a laterally-facing access opening on said shell sidewall and extending inwardly therefrom;
    a plurality of first supporting members protruding downwardly from said bottom surface around the outer edge thereof; and
    at least one pair of second supporting members protruding downwardly from said bottom surface and positioned in opposed relation to define therebetween at least one section on said bottom surface, with a first end of said at least one section open to at least part of the edge of said at least one first opening, said at least one section for promoting seepage into and out of the at least one first opening.

5. The flowerpot of claim 4, wherein said bottom surface is substantially circular.

6. The flowerpot of claim 5, wherein said at least one channel extends at least partially radially inwardly along said bottom surface from the shell sidewall.

7. The flowerpot of claim 6, wherein said at least one pair of second supporting members extends radially inwardly from and in substantial alignment with said at least one channel to define said at least one section, said at least one section being defined substantially between an end of said at least one channel and said at least one first opening for communication therebetween.

8. The flowerpot of claim 7, wherein at least one second opening is defined in the top wall of said at least one channel and said at least one first and second openings are in substantial radial alignment with each other.

9. The flowerpot of claim 6, wherein at least one pair of second supporting members extends substantially radially inwardly between the outer wall of the bottom surface and the at least one first opening to define the at least one section for communication therebetween.

10. The flowerpot of claim 6, wherein the plurality of first supporting members are ribs which define the channel side walls of said at least one channel and the ribs extend radially inwardly on the bottom surface from the outer edge thereof, and said at least one pair of second supporting members are extensions of the ribs.

11. The flowerpot of claim 10, wherein at least one second opening is defined in the top wall of the at least one channel and said at least one first and second openings are in substantial radial alignment with each other and said at least one first and second supporting members are positioned to define the at least one section between said at least one first and second openings.

12. The flowerpot of claim 5, wherein said at least one channel extends radially across the bottom surface and said at least one pair of second supporting members extends substantially in perpendicular relation relative to said at least one channel between at least one of said channel side walls and said at least one first opening to define the at least one section for communication therebetween.

13. The flowerpot of claim 5, wherein a single channel is defined and said single channel extends annularly around the outer circumference of said bottom surface and being inwardly bounded by said channel side wall, which is circumferential and disposed inwardly from the outer edge of the bottom surface, and outwardly bounded by said plurality of first supporting members, and said at least one pair of second supporting members extends radially inwardly between the channel side wall and the at least one first opening to define the at least one section between the single channel and the at least one first opening with a second end of said at least one section facing the channel side wall.

14. The flowerpot of claim 13, wherein at least one second opening is defined in the top wall of said at least one channel; and said at least one first and second openings are in substantial radial alignment with each other.

\* \* \* \* \*

UNITED STATES PATENT AND TRADEMARK OFFICE
CERTIFICATE OF CORRECTION

PATENT NO. : 5,870,855

DATED : February 16, 1999

INVENTOR(S) : HOUGAARD

It is certified that an error appears in the above-identified patent and that said Letters Patent is hereby corrected as shown below:

Claim 1, col. 5, line 39: change "l east" to --least--.

Claim 1, col. 5, line 62: replace "channel," with --channels (18),--.

Claim 3, col. 6, line 8: after "channel", insert --(18c)--.

Claim 13, col. 8, line 4: replace "facing" with --opening to--.

In the abstract, line 13: change "cad" to --end--.

Signed and Sealed this

Seventh Day of September, 1999

*Attest:*

Q. TODD DICKINSON

*Attesting Officer*     Acting Commissioner of Patents and Trademarks